United States Patent
Okamoto

(10) Patent No.: US 7,333,139 B2
(45) Date of Patent: Feb. 19, 2008

(54) DIGITAL CAMERA HAVING CORRECTION OF CENTER POSITIONS OF COLOR PIXELS GENERATED BY MIXING OF PIXELS OF THE SAME COLOR

(75) Inventor: Satoru Okamoto, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 689 days.

(21) Appl. No.: 10/400,578

(22) Filed: Mar. 28, 2003

(65) Prior Publication Data

US 2003/0193580 A1    Oct. 16, 2003

(30) Foreign Application Priority Data

Mar. 29, 2002    (JP) .............. 2002-095478

(51) Int. Cl.
*H04N 5/235* (2006.01)
*H04N 5/228* (2006.01)
*H04N 3/14* (2006.01)
*H04N 5/335* (2006.01)

(52) U.S. Cl. .............. 348/230.1; 348/222.1; 348/272; 348/282

(58) Field of Classification Search .............. 348/272, 348/273, 280, 282, 277, 222.1, 230.1; 358/515, 358/518, 525; 382/299
See application file for complete search history.

(56) References Cited

U.S. PATENT DOCUMENTS

| | | | | |
|---|---|---|---|---|
| 5,287,192 A | * | 2/1994 | Iizuka | ............... 348/311 |
| 5,418,565 A | * | 5/1995 | Smith | ............... 348/273 |
| 6,198,507 B1 | * | 3/2001 | Ishigami | ............... 348/273 |
| 6,236,433 B1 | * | 5/2001 | Acharya et al. | ............... 348/273 |
| 6,414,717 B1 | * | 7/2002 | Kondo et al. | ............... 348/441 |
| 6,686,960 B2 | * | 2/2004 | Iizuka | ............... 348/273 |
| 6,885,399 B1 | * | 4/2005 | Kawashiri | ............... 348/273 |
| 6,930,716 B2 | * | 8/2005 | Yoshida | ............... 348/322 |

FOREIGN PATENT DOCUMENTS

| | | |
|---|---|---|
| JP | 2587225 B2 | 12/1996 |
| JP | 2000-184385 A | 6/2000 |
| JP | 2001-298748 | 10/2001 |
| JP | 2003-092764 | 3/2003 |

* cited by examiner

*Primary Examiner*—Lin Ye
*Assistant Examiner*—Richard M Bemben
(74) *Attorney, Agent, or Firm*—Birch, Stewart, Kolasch & Birch, LLP

(57) ABSTRACT

In a digital camera by the use of a CCD of a honeycomb array, the center positions of mixed pixels of colors B and G are fixed in (4k+1)th and (4k+2)th rows, wherein k represents an integer 0 or more, while the center positions of mixed pixels (mixed pixels R11 and R15) of a color R in the (4k+1)th row are required to be shifted to positions indicated by circles drawn by dotted lines in FIG. 4, as indicated by arrows in FIG. 4. For example, pixel values of the mixed pixels R11 and R15 are weighed in a weighing ratio of 1:3 so as to take a weighted average (i.e., (R11+3R15)/4) in such a manner that the center position of the mixed pixel R15 is shifted to a position obtained by dividing the distance between the center positions of the mixed pixels R11 and R15 at 3:1.

11 Claims, 11 Drawing Sheets

| B | B | B | B | B | B | B | B |
|---|---|---|---|---|---|---|---|
| G | G | G | G | G | G | G | G |
| R | R | R | R | R | R | R | R |
| B | B | B | B | B | B | B | B |
| G | G | G | G | G | G | G | G |
| R | R | R | R | R | R | R | R |
| B | B | B | B | B | B | B | B |
| G | G | G | G | G | G | G | G |
| R | R | R | R | R | R | R | R |
| B | B | B | B | B | B | B | B |
| G | G | G | G | G | G | G | G |
| R | R | R | R | R | R | R | R |
| B | B | B | B | B | B | B | B |
| G | G | G | G | G | G | G | G |
| R | R | R | R | R | R | R | R |
| B | B | B | B | B | B | B | B |
| G | G | G | G | G | G | G | G |
| R | R | R | R | R | R | R | R |

FIG.9

| | 1 | 2 | 3 | 4 | 5 | 6 | 7 | 8 |
|---|---|---|---|---|---|---|---|---|
| FIRST ROW | R | G | R | G | R | G | R | G |
| SECOND ROW | G | B | G | B | G | B | G | B |
| THIRD ROW | R | G | R | G | R | G | R | G |
| FOURTH ROW | G | B | G | B | G | B | G | B |
| FIFTH ROW | R | G | R | G | R | G | R | G |
| SIXTH ROW | G | B | G | B | G | B | G | B |
| SEVENTH ROW | R | G | R | G | R | G | R | G |
| EIGHTH ROW | G | B | G | B | G | B | G | B |
| | R | G | R | G | R | G | R | G |
| | G | B | G | B | G | B | G | B |
| | R | G | R | G | R | G | R | G |
| | G | B | G | B | G | B | G | B |
| | R | G | R | G | R | G | R | G |
| | G | B | G | B | G | B | G | B |
| | R | G | R | G | R | G | R | G |
| | G | B | G | B | G | B | G | B |

DIGITAL CAMERA HAVING CORRECTION OF CENTER POSITIONS OF COLOR PIXELS GENERATED BY MIXING OF PIXELS OF THE SAME COLOR

BACKGROUND OF THE INVENTION

1. Field of the Invention

The present invention relates to a digital camera and an image pickup device which are featured by mixed pixels and, more particularly, to a digital camera and an image pickup device, in which a subject is picked up by the use of an image pickup unit provided with groups of pixels arrayed in a predetermined manner, so that image data representing the picked-up subject is obtained.

2. Description of the Related Art

In recent years, there has been prevailed a digital camera for picking up the image of a subject as a still image or a moving image by the use of an image pickup system, which is configured by including an image pickup element such as a CCD (i.e., Charge Coupled Device) sensor (hereinafter abbreviated as "a CCD") for picking up the image of the subject. In such a digital camera, the resolution of a pixel of the image pickup element has been increased in order to meet the demand for image pickup at a high resolution. In general, as for a still image, image data is produced by using all of pixels of the image pickup element. In contrast, as for a moving image, image data at a low resolution by using the small number of pixels such as a VGA (i.e., a Video Graphics Array) size (specifically, 640×480 pixels) is preferable. This is because if the number of pixels is large, it takes much time to read out the image, thereby reducing a frame rate, so as to produce a constrained moving image.

As disclosed in Japanese Patent No. 2,587,225, there has been conventionally the technique of increasing the frame rate, in which a plurality of pixels adjacent to each other in horizontal and vertical directions on a CCD are read out in mixture. Furthermore, the spotlight has recently centered on a CCD capable of reading out pixels of the same color in mixture (that is, adding electric charges together).

However, the center positions of resultant mixed pixels of each of colors may be shifted by simply mixing the pixels of the same color arrayed in the horizontal or vertical direction, and consequently, the center positions of the mixed pixels may not be uniformly arranged, although the pixels on the CCD are uniformly arrayed. If an image is produced by using the above-described mixed pixels as they are, a false signal or a false color may be generated, thereby arising a problem that an image of a high quality cannot be produced, for example, there occurs an aliasing.

SUMMARY OF THE INVENTION

The present invention has been accomplished to solve the above-described problem. An object of the invention is to provide a digital camera capable of preventing any generation of a false signal or a false color in the case where an image of a low resolution is produced by mixing pixels of the same color.

In order to achieve the above-described object, in one aspect of the present invention, there is provided a digital camera for picking up the image of a subject by using an image pickup element provided with groups of pixels in a predetermined pixel array, so as to acquire image data representing the image of the picked-up subject, wherein when the image data representing the subject and having a resolution lower than a highest resolution is generated by mixing pixels of the same color, center positions of the pixels of respective colors, which center positions are shifted by the mixing, are corrected so as to be uniformly arranged at least within respective rows.

The center positions of the mixed pixels are corrected in such a manner that the centers of the pixels (the mixed pixels) of each of the colors, which are shifted by the mixing, are uniformly arranged per at least row in the case where the plurality of pixels of the same color are mixed together in order to produce the image data representing the subject of the resolution lower than the highest resolution. Consequently, it is possible to reduce the generation of a false signal or a false color in the produced image data of the low resolution. In this digital camera, the pixels of the same color may be read out in mixture from the image pickup element. Otherwise, the pixels may be mixed together by image processing after the data on all of the pixels is read out from the image pickup element.

According to another aspect of the present invention, there is provided a digital camera comprising: an image pickup unit which is provided with groups of pixels in a predetermined pixel array, for receiving light corresponding to a subject via each of the pixels so as to pick up the subject, and which is able to pick up the subject at a resolution lower than a highest resolution by mixing the pixels of the same color; and a correcting unit for correcting a result of picking-up by the image pickup unit such that center positions of the pixels of respective colors, which are shifted by the mixing, can be uniformly arranged at least within respective rows in the case where the subject is picked up by the image pickup unit at a resolution lower than the highest resolution.

The image pickup element can pick up the image of the subject at the resolution lower than the highest resolution by mixing the plurality of pixels of the same color: namely, the plurality of pixels of the same color can be read out from the image pickup element in mixture. In this case, with respect to the picking-up result by the image pickup element, the correcting unit can correct the center positions in such a manner that the centers of the pixels (the mixed pixels) of each of the colors, which are shifted by the mixing of the pixels, are uniformly arranged per at least row. Consequently, it is possible to reduce the generation of a false signal or a false color in the produced image data of the low resolution.

According to a further aspect of the present invention, there is provided an image pickup device comprising: an image pickup unit for picking up an image of a subject via a plurality of pixels in a predetermined pixel array, and obtaining pixel values of mixed pixels by mixing a plurality of pixel values for each group of a plurality of pixel groups, each of which is composed of a plurality of pixels acquired by the image pickup, and a correcting unit for calculating a pixel value of a corrected pixel positioned among the plurality of mixed pixels obtained by the image pickup unit, based on positional information of the corrected pixel with respect to positions of the plurality of mixed pixels and the pixel values of the plurality of mixed pixels.

Incidentally, in the above-described digital camera, it is possible to more suppress the generation of a false signal or a false color by correcting the arrangement of the pixel centers of each of the colors in such a manner as to accord with the predetermined pixel array, and further, to facilitate data handling.

BRIEF DESCRIPTION OF THE DRAWINGS

FIG. 6 is a diagram conceptually illustrating the pixel array for each color in a CCD with an array composed of a G stripe and an R/B complete zigzag.

FIG. 7 is a diagram conceptually illustrating the pixel array for each color in a CCD with an RGB stripe array in a second embodiment.

FIG. 9 is a diagram conceptually illustrating the array of pixels of colors in a CCD of a Bayer array in a third embodiment.

DETAILED DESCRIPTION OF THE EMBODIMENTS

First Embodiment

A first embodiment according to the present invention will be described below in reference to the accompanying drawings.

Figure 1:
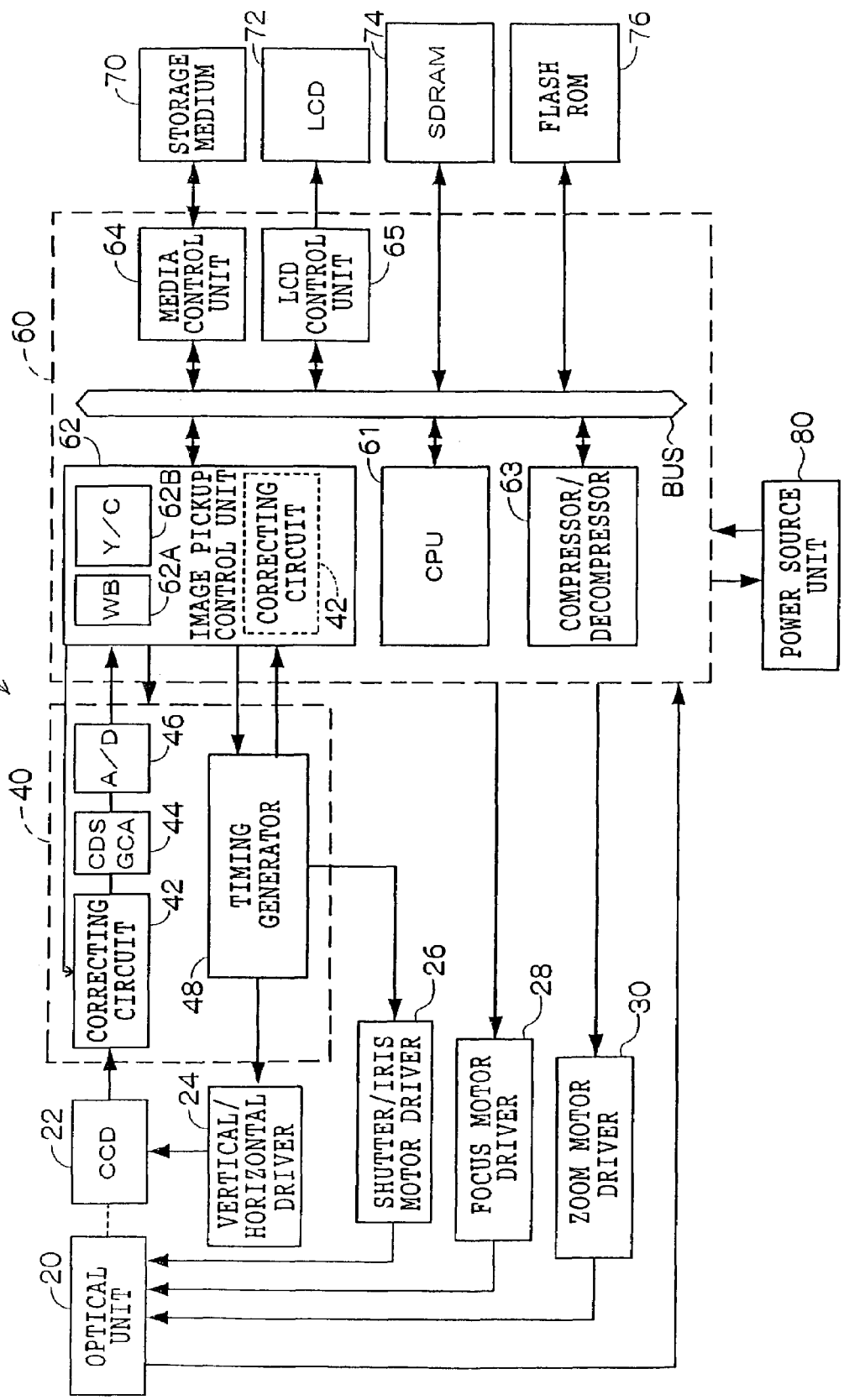
FIG. 1 is a block diagram illustrating the configuration of an electric system of a digital camera in a first embodiment.

FIG. 1 is a diagram illustrating the configuration of an electric system of a digital camera 10, to which the invention is applied. This digital camera 10 comprises: an optical unit 20 including a lens for focusing an image of a subject; a CCD 22 disposed behind the optical axis of the above-described lens; a signal processing unit 40 for producing digital image data representing the image of the subject in response to a signal output from the CCD 22 and producing timing signals for driving component parts in the optical unit 20, the CCD 22 and the like; a main control unit 60 for managing the entire operation of the digital camera 10; a vertical/horizontal driver 24 for driving the CCD 22; a shutter/iris motor driver 26 for driving a shutter and an iris mechanism included in the optical unit 20; a focus motor driver 28 for driving a focus adjusting motor included in the optical unit 20; and a zoom motor driver 30 for driving a zoom motor included in the optical unit 20.

Here, each of the signal processing unit 40 and the main control unit 60 is configured in the form of a one-chip LSI (i.e., a Large Scale Integrated circuit), thereby achieving miniaturization, high reliability and a low cost of the digital camera 10.

Furthermore, the digital camera 10 comprises: a liquid crystal display (abbreviated as "an LCD") 72 for displaying thereon the image of the subject obtained by picking-up by the CCD 22 and various kinds of information; an SDRAM (i.e., a Synchronous Dynamic RAM) 74 for storing therein digital image data obtained by mainly picking-up by the CCD 22; a flash ROM 76 for storing therein various kinds of parameters, programs and the like; and a power source unit 80 for supplying electric power to the main control unit 60.

In the meantime, the signal processing unit 40 includes a correcting circuit 42, a CDS.GCA 44 provided with a correlated double sampling (abbreviated as "CDS") circuit and a gain control amplifier (abbreviated as "a GCA"), an A/D converter 46 and a timing generator 48.

Moreover, the main control unit 60 incorporates a CPU (i.e., a central processing unit) 61 for managing the entire operation of the main control unit 60 and a line buffer having predetermined capacity and is configured such that an image pickup control unit 62 including a white balance adjusting circuit (abbreviated as "a WB") 62A for adjusting the fluctuation of a white balance and a Y/C converting circuit (abbreviated as "a Y/C") 62B for converting RGB data into a YC signal, a compressor/decompressor 63 for compressing digital image data in a predetermined compression format (for example, JPEG, i.e., the format of the Joint Photographic Experts Group or the like) and extending the compressed digital image data, a media control unit 64 and an LCD control unit 65 are connected to each other via a bus BUS.

To the media control unit 64 is connected a portable storage medium 70 such as a smart medium, an IC card, a CD-R or a CD-RW. The media control unit 64 controls to write various kinds of information in the storage medium 70 or read out the various kinds of information written in the storage medium 70. Additionally, to the LCD control unit 65 is connected the above-described LCD 72, on which the various kinds of information are displayed under the control of the LCD control unit 65. Incidentally, the LCD 72 can be used as a finder for displaying a moving image (i.e., a through image) obtained by sequential picking-up by the CCD 22.

Furthermore, the SDRAM 74 and the flash ROM 76 are connected to the bus BUS in the main control unit 60. Consequently, the CPU 61 can arbitrarily make access to the various kinds of data stored in the SDRAM 74 and the flash ROM 76.

In the meantime, the output terminal of the CCD 22 is connected to the image pickup control unit 62 via the correcting circuit 42, the CDS•GCA 44 and the A/D converter 46 in order. The correcting circuit 42 is connected also to the image pickup control unit 62, which therefore controls the drive of the correcting circuit 42.

A signal output from the CCD 22 is subjected to a correcting processing, by which the correcting circuit 42 corrects the center position of a pixel, as required, described later, it is subjected to a correlated double sampling processing by the CDS•GCA 44 and sensitivity adjustment with respect to each of R (red), G (green) and B (blue), and thereafter, it is inputted to the A/D converter 46 as an R, G or B signal per pixel. The A/D converter 46 converts the R, G and B signals, which have been sequentially inputted by the CDS•GCA 44, into digital signals, each having the predetermined number of bits (hereinafter referred to "digital image data"), and then, outputs them to the image pickup control unit 62.

The image pickup control unit 62 accumulates the digital image data, which have been sequentially input by the A/D converter 46, in a line buffer incorporated in the image pickup control unit 62, and then, temporarily stores them in the SDRAM 74.

The digital image data stored in the SDRAM 74 is read out by the WB 62A under the control of the CPU 61, and thus, is subjected to the adjustment of the white balance by applying a digital gain according to the type of a light source, and further, predetermined digital image data is produced by a gamma processing and a sharpness processing. Moreover, the digital image data is subjected to a YC signal processing by the Y/C 62B, so that an illuminance signal Y and chromatic signals Cr and Cb (hereinafter referred to as "YC signals") are produced, and thus, the YC signals are stored again in the SDRAM 74.

Here, in the case where the LCD 72 is used as a finder, the produced YC signals are output in sequence to the LCD control unit 65, so that a through image is displayed on the LCD 72.

Moreover, in the case where a shutter button, not illustrated, is depressed by a photographer, the YC signals stored in the SDRAM 74 are compressed in a predetermined compression format by the compressor/decompressor 63, and then, are stored in the storage medium 70 via the media control unit 64.

In the meantime, to the timing generator 48 are connected the vertical/horizontal driver 24, the shutter/iris motor driver 26 and the image pickup control unit 62. The timing generator 48 outputs a timing signal for driving the CCD 22 to the vertical/horizontal driver 24, a timing signal for driving a mechanical shutter and the iris mechanism included in the optical unit 20 to the shutter/iris motor driver 26, and a timing signal for driving the image pickup control unit 62 to the image pickup control unit 62, respectively.

Moreover, the respective input terminals of the focus motor driver 28 and the zoom motor driver 30 are connected to the main control unit 60 (more particularly, to the CPU 61). The output terminal of the focus motor driver 28 is connected to a focus adjusting motor included in the optical unit 20, and further, the output terminal of the zoom motor driver 30 is connected to a zoom motor included in the optical unit 20.

A plurality of lenses are included in the optical unit 20 in the present embodiment. They are configured in the form of a zoom lens capable of varying a focus distance. Each of the lenses is provided with a lens driving mechanism, not illustrated. This lens driving mechanism includes therein the zoom motor and the focus adjusting motor. The zoom motor and the focus adjusting motor are driven in response to drive signals supplied from the zoom motor driver 30 and the focus motor driver 28, respectively, under the control of the CPU 61.

The CPU 61 controls to drive the zoom motor when an optical zoom magnification is varied, so as to vary the focus distance of each of the lenses included in the optical unit 20.

Furthermore, the CPU 61 performs a focusing control by controlling to drive the focus adjusting motor in such a manner that the contrast of an image obtained by picking-up by the CCD 22 becomes maximum. That is to say, in the digital camera 10 in the present embodiment, a so-called TTL (i.e., Through The Lens) system, in which the position of the lens is set in such a manner the contrast of the read image becomes maximum, is adopted as the focusing control. The focusing control is automatically performed by half depressing a shutter button, not illustrated, in the state in which a subject is located at a position indicated by an auto-focus frame.

Figure 2:
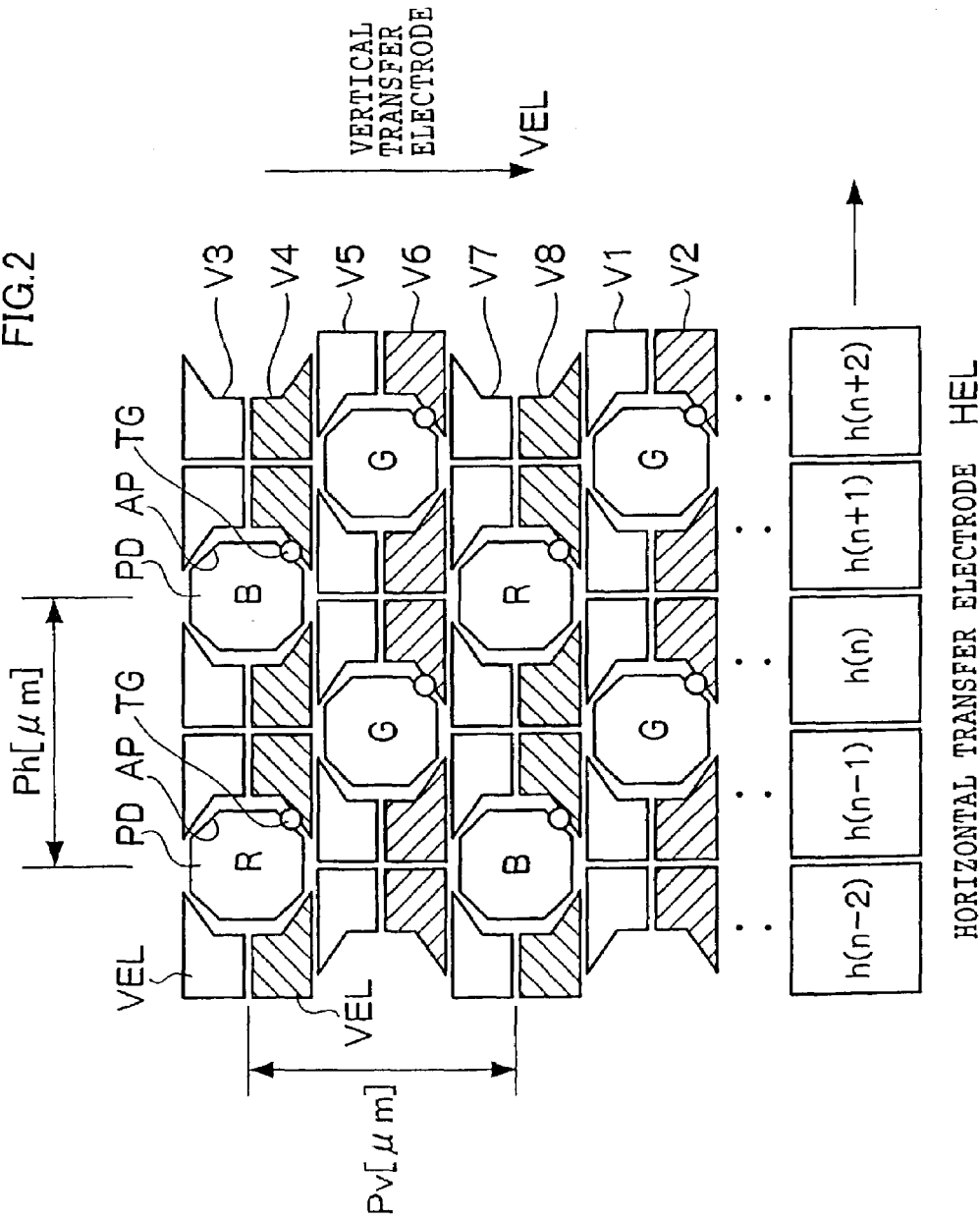
FIG. 2 is a diagram schematically illustrating the arrangement of a part of a CCD image pickup unit in the first embodiment.

A honeycomb CCD proposed by the present applicant, as illustrated in FIG. 2, can be used as the CCD 22. The honeycomb CCD is provided with pixel groups of a predetermined pixel array, in which each of pixels receives light corresponding to the image of a subject so as to pick up the image of the subject, and further, can pick up the image at a resolution lower than a highest resolution by mixing a plurality of pixels of the same color.

As illustrated in FIG. 2, the image pickup unit of the CCD 22 comprises: a plurality of light receiving elements PD which are two-dimensionally arrayed at a predetermined array pitch (i.e., at a horizontal array pitch of Ph (μm) and a vertical array pitch of Pv (μm)), the adjacent light receiving elements PD (pixels) being shifted in vertical and horizontal directions; a color separating filter, described later, for covering an aperture AP formed in front of the light receiving element PD; a vertical transfer electrode VEL disposed in such a manner as to bypass the aperture AP and adapted to take out a signal (i.e., an electric charge) from the light receiving element PD so as to transfer it in the vertical direction; and a horizontal transfer electrode HEL disposed downward in the vertical direction of the vertical transfer electrode VEL positioned undermost in the vertical direction so as to transfer the signal transferred from the vertical transfer electrode VEL to the outside. In an example illustrated in FIG. 2, the aperture AP is formed into an octagonal honeycomb shape.

Here, a vertical transfer electrode group composed of the plurality of vertical transfer electrodes VEL arranged linearly in the horizontal direction is configured such that any one of vertical transfer drive signals V1, V2, . . . , V8 can be applied at the same time to the vertical transfer electrode group. Moreover, each of the light receiving elements PD is configured in such a manner as to be electrically connected to an adjacent one of the vertical transfer electrodes VEL via a transfer gate TG.

In the example illustrated in FIG. 2, each of the light receiving elements PD is configured in such a manner as to be connected to an adjacent lower right vertical transfer electrode VEL via the transfer gate TG. Additionally, in the example illustrated in FIG. 2, a vertical transfer drive signal V3 can be applied to the vertical transfer electrode group on a first row; another vertical transfer drive signal V4 can be applied to the vertical transfer electrode group on a second row; a vertical transfer drive signal V5 can be applied to the vertical transfer electrode group on a third row; a vertical transfer drive signal V6 can be applied to the vertical transfer electrode group on a fourth row; a vertical transfer drive signal V7 can be applied to the vertical transfer electrode group on a fifth row; a vertical transfer drive signal V8 can be applied to the vertical transfer electrode group on a sixth row; a vertical transfer drive signal V1 can be applied to the vertical transfer electrode group on a seventh row; and a vertical transfer drive signal V2 can be applied to the vertical transfer electrode group on an eighth row, respectively.

Each of the light receiving elements PD of the CCD 22 is adapted to read out an electric charge accumulated according to the subject image in response to a timing signal output from the timing generator 48 by applying a vertical transfer drive signal and a horizontal transfer drive signal to the vertical transfer electrode VEL and the horizontal transfer electrode HEL from the vertical/horizontal driver 24, respectively. The image pickup control unit 62 controls to drive the timing generator 48. That is to say, the image pickup control unit 62 controls to drive the CCD 22 via the timing generator 48 and the vertical/horizontal driver 24.

Moreover, the image pickup unit of the CCD 22 is configured such that a vertical adjacent region of one light receiving element region is composed of four electrodes while a horizontal adjacent region thereof is composed of two electrodes, as illustrated in FIG. 2.

The aperture AP formed in front of each of the light receiving elements PD is covered with the color separating filter, which transmits light composed of a predetermined color component. Specifically, in FIG. 2, the aperture AP formed in front of the light receiving element PD marked with 'R' is covered with a color separating filter which transmits a red light; the aperture AP formed in front of the light receiving element PD marked with 'G' is covered with a color separating filter which transmits a green light; and the aperture AP formed in front of the light receiving element PD marked with 'B' is covered with a color separating filter which transmits a blue light, respectively. In other words, the light receiving element PD marked with 'R' receives a red light; the light receiving element PD marked with 'G' receives a green light; and the light receiving element PD marked with 'B' receives a blue light, respectively.

In the present embodiment, the image pickup control unit 62 is adapted to control the drive of the CCD 22 in such a manner that each of the electric charges accumulated in all of the light receiving elements PD in the CCD 22 is read out when a still image is picked up. In contrast, the image pickup control unit 62 controls the drive of the CCD 22 in such a manner that the electric charges accumulated in the two light receiving elements PD for receiving the lights of the same color, arrayed in the horizontal direction in the CCD 22 are read out in addition when a moving image is picked up. Specifically, the image pickup is performed at a high resolution by the use of all of the pixels in the CCD 22 when the still image is picked up; in contrast, the two pixels of the same color arrayed in the horizontal direction are read out in mixture from the CCD 22 when the moving image is picked up, so that the moving image can be read out at a resolution lower than that in the case of the still image. Here, reading out the pixels in mixture signifies reading out the added or averaged pixel values of the two or more pixels.

Additionally, the image pickup control unit 62 actuates the correcting circuit 42, and controls the drive of the correcting circuit 42 so as to correct the center position of the mixed pixel in such a manner that the center position of each of the mixed pixels becomes uniform in at least one row in the horizontal direction with respect to an output signal of the CCD 22, that is, a signal indicating a mixed pixel value when the moving image is picked up. When the still image is picked up, the output signal of the CCD 22 passes over the correcting circuit 42, and then, is input into the CDS•GCA 44.

Next, explanation will be made on operation in the present embodiment. The digital camera 10 in the present embodiment is started upon the start of the supply of the electric power from the power source unit 80 by the operation of a power source switch, not illustrated, by a user. The user switches a still image pickup mode and a moving image pickup mode by operating a switch, not illustrated, so as to display moving images (i.e., through images) sequentially obtained by the picking-up by the CCD 22 on the LCD 72, which also serves as the finder, thereby picking up the still image or the moving image.

Here, in the digital camera 10, output signals corresponding to all of the pixels are acquired from the CCD 22 in the case where the still image is picked up. The image pickup control unit 62 turns off the correcting processing by the correcting circuit 42. A signal output from the CCD 22 is input into the CDS•GCA 44 via the correcting circuit 42 as it is. The signal is subjected to the correlated double sampling processing and the sensitivity adjustment of each of the colors R, G and B by the CDS•GCA 44, and then, is converted into digital image data by the A/D converter 46. In other words, when the still image is picked up, the digital image data of a high resolution can be acquired.

Thus, the digital image data is subjected to the white balance adjustment, the gamma processing, the sharpness processing or the YC signal processing by the image pickup control unit 62, and then, is temporarily stored in the SDRAM 74. Thereafter, the digital image data is displayed on the LCD 72, or is stored in the storage medium 70 after the compression by the compressor/decompressor 63.

In contrast, when the moving image is picked up (also when the through image is acquired), the CCD 22 reduces the number of pixels by mixing two pixels of the same color arrayed in the horizontal direction in order to increase a frame rate. A signal output from the CCD 22, which is obtained at this time, is subjected to the correcting processing by the correcting circuit 42 under the control of the image pickup control unit 62, as necessary, and then, is subjected to the correlated double sampling processing and the sensitivity adjustment of each of the colors R, G and B by the CDS•GCA 44, to be converted into digital image data by the A/D converter 46. Thereafter, in the same manner, the digital image data is subjected to the white balance adjustment, the gamma processing, the sharpness processing or the YC signal processing by the image pickup control unit 62, and then, is temporarily stored in the SDRAM 74. Thereafter, the digital image data is displayed on the LCD 72, or is stored in the storage medium 70 after the compression by the compressor/decompressor 63.

Figure 3:
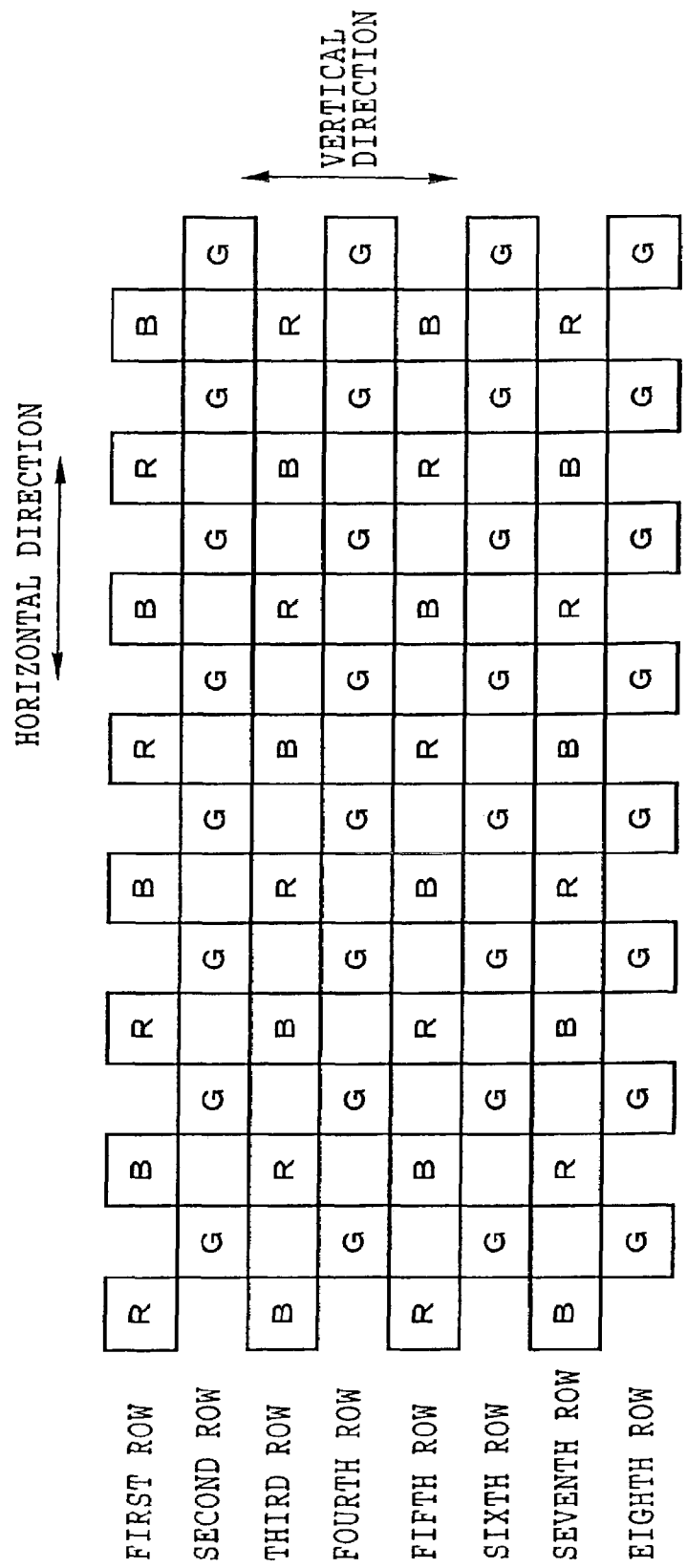
FIG. 3 is a diagram conceptually illustrating the pixel array for each color in a CCD with a honeycomb array in the first embodiment.

Here, a description will be given of the principle of the correcting processing by the correcting circuit 42. FIG. 3 is a diagram schematically illustrating the arrangement of the light receiving elements PD, each of which receives the light of the color R, G or B in the CCD 22, that is, the array of the pixels of the colors R, G and B in the CCD 22.

Each of the pixels in the honeycomb CCD receives the light of any one of the colors R, G and B. In the array of the pixels, a first row is composed of R and G disposed in alternation, a second row is composed of G and B disposed in alternation, and a third and following rows are alternating repetitions of the first and second rows in a first direction obtained by rotating the direction, in which the vertical transfer electrode VEL is formed, at an angle of 45° and a second direction perpendicular to the first direction.

Assuming that the direction, in which the vertical transfer electrode VEL is formed, is referred to as the vertical direction while the direction, in which the horizontal transfer electrode HEL is formed, is referred to as the horizontal direction, pixels R and pixels B are alternately arrayed apart with an interval of one pixel in the first row and pixels G are arrayed apart with an interval of one pixel in the second row and in columns, which fall void in the first row, in the array of the pixels arrayed in the horizontal direction, as illustrated in FIG. 3. In the third row, the pixels R and the pixels B are alternately arrayed apart with an interval of one pixel, wherein the pixels B are arrayed in columns, in which the pixels R are arrayed in the first row, and the pixels R are arrayed in columns, in which the pixels B are arrayed in the first row. In the fourth row, the pixels G are arrayed apart with an interval of one pixel in columns, which fall void in the third row. In a fifth row and thereafter, the arrays in the first to fourth rows are repeated.

Figure 4:
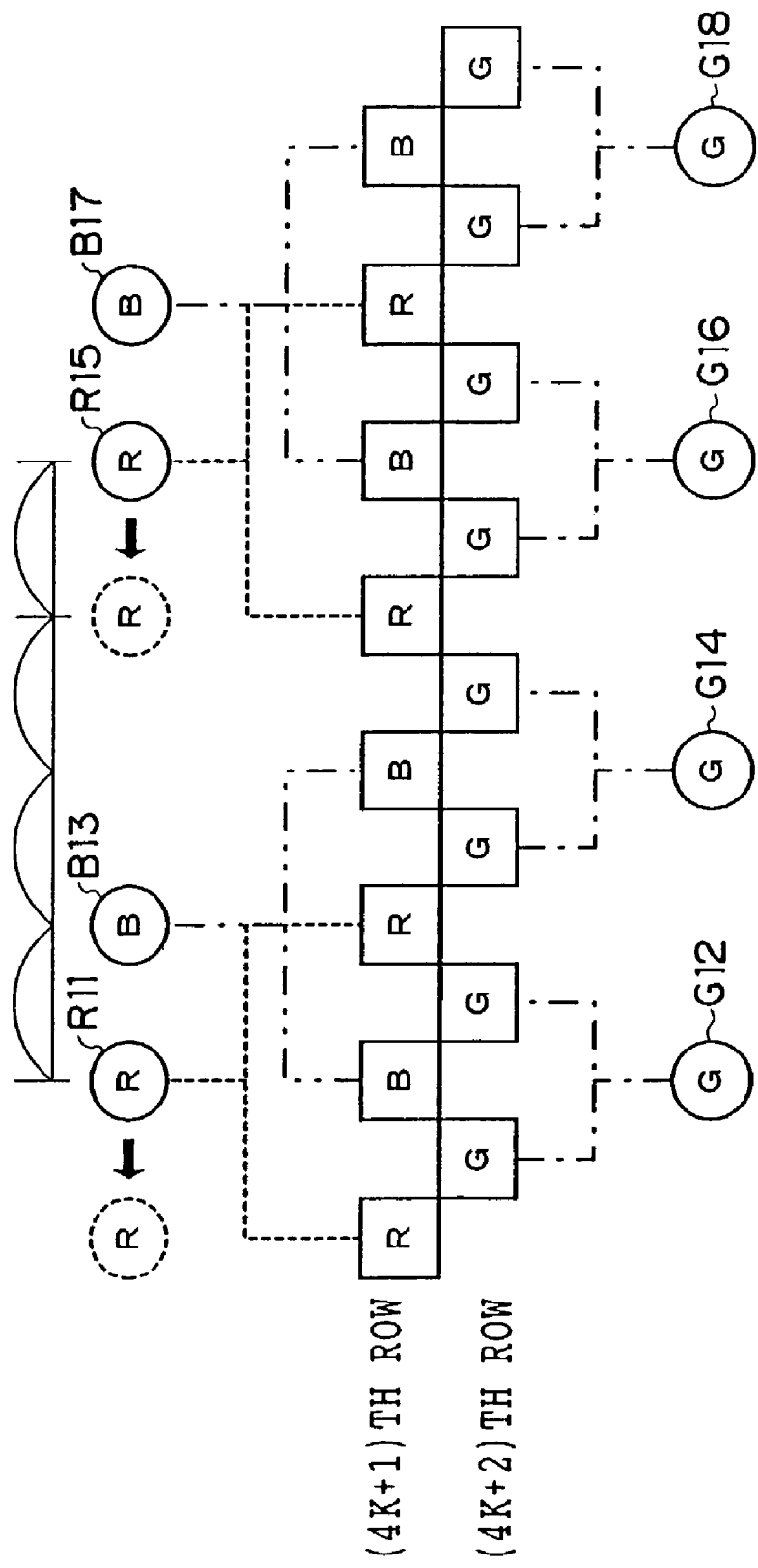
FIG. 4 is a diagram conceptually illustrating a method for correcting the center position of a mixed pixel in the case where two pixels of the same color are read out in mixture in the CCD of the honeycomb array in the first embodiment.
Figure 5:
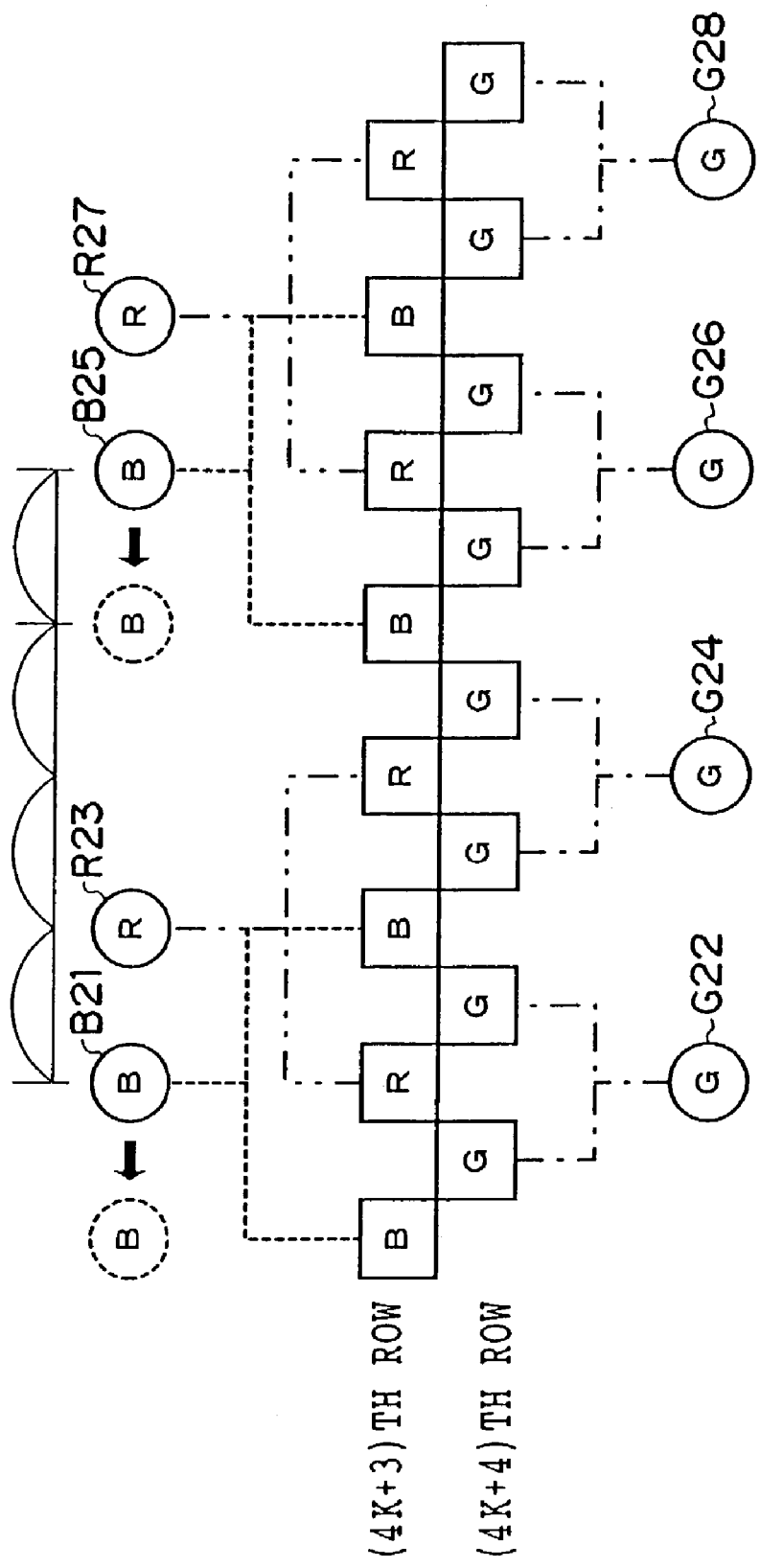
FIG. 5 is a diagram conceptually illustrating a method for correcting the center position of the mixed pixel in the case where the two pixels of the same color are read out in mixture in the CCD of the honeycomb array in the first embodiment.

When the moving image is picked up, since the two pixels of the same color arrayed in the horizontal direction are read out in mixture from the CCD 22, the center position of the pixels read in mixture (hereinafter referred to as "mixed pixels") is located at the center of the two pixels, which have been mixed to produce the mixed pixels, as illustrated in FIGS. 4 and 5.

Incidentally, a (4k+1)th row and a (4k+2)th row, which are adjacent to each other in the vertical direction in the CCD 22 are illustrated in FIG. 4, and a (4k+3)th row and a (4k+4)th row, which are also adjacent to each other in the vertical direction in the CCD 22 are illustrated in FIG. 5, wherein k represents an integer 0 or more. In FIG. 4 and FIG. 5, the center of the mixed pixel obtained by mixing the two pixels of the same color arrayed in the horizontal direction is indicated by a circle drawn by a solid line. Hereinafter, in order to distinguish the mixed pixels from each other, each of the mixed pixels will be explained by adding a two-digit numeral XY to an alphabet (R, G or B) representing the color of the mixed pixel, wherein X is 1 in the (4k+1)th or (4k+2)th row and is 2 in the (4k+3)th or (4k+4)th row, and further, Y represents the order of the mixed pixel from the left in FIG. 4 or 5.

As is clear from FIG. 4, in the case where the two pixels of the same color arrayed in the horizontal direction are mixed together in each of the (4k+1)th row and the (4k+2)th row, wherein k represents an integer 0 or more, the center of each of the mixed pixels (R11 and R15, B13 and B17) is uniformly arranged in the horizontal direction when they are viewed per color of R or B in the (4k+1)th row. However, when the colors are viewed as a whole, the distance between the centers of the mixed pixels B13 and R15 is greater than that between the centers of the mixed pixels R11 and B13, and therefore, the centers are not uniformly arranged. In the (4k+2)th row, the centers of the mixed pixels of the color G are uniformly arranged in the horizontal direction, and further, are located at the same positions as the centers of the mixed pixels of the color R in the (4k+1)th row.

In order to uniformly arrange the center positions of the mixed pixels including the mixed pixels of the color R in the horizontal direction in the (4k+1)th row, the center positions of the mixed pixels of the color R (i.e., the mixed pixels R11 and R15) are required to be shifted to, for example, positions indicated by circles drawn by dotted lines (see arrows in FIG. 4). For example, the center of the mixed pixel R15 is required to be shifted to a position dividing the distance between the center positions of the mixed pixels R11 and R15 at a ratio of 3:1.

The above-described shift of the center of the mixed pixel can be achieved by calculating a pixel value of a corrected pixel positioned between a plurality of mixed pixels by weighing the pixel values of the plurality of mixed pixels based on the ratio of the distance from the corrected pixel to each of the plurality of mixed pixels, and then, by substituting the pixel value of the mixed pixel to be shifted with a pixel value of the corrected pixel.

Specifically, the center of the mixed pixel R15 can be shifted by weighing the pixel values of the mixed pixels R11 and R15 at a weighing ratio of 1:3, and then, taking a weighted average (i.e., (R11+3R15)/4).

In the same manner, in the case where the two pixels of the same color arrayed in the horizontal direction in each of the (4k+3)th row and the (4k+4)th row, wherein k represents an integer 0 or more, are mixed together, the centers of the mixed pixels of the color B (i.e., the mixed pixels B21 and B25) are required to be shifted to, for example, positions indicated by circles drawn by dotted lines (see arrows in FIG. 5), as illustrated in FIG. 5. For example, the center position of the mixed pixel B25 is required to be shifted to a position obtained by dividing the distance between the center positions of the mixed pixels B21 and B25 at 3:1. The center position of the mixed pixel B25 can be shifted by weighing the pixel values of the mixed pixels B21 and B25 at a weighing ratio of 1:3, and then, taking a weighted average (i.e., (B21+3B25)/4). Such a weighted average is expressed by the following equation:

$$z=(bx+ay)/(a+b)$$

wherein z represents a pixel value of a corrected pixel located at a position at which the distance between a mixed pixel having a pixel value x and a mixed pixel having a pixel value y is divided at a ratio of a:b.

To sum up the above description, the correcting circuit 42 outputs an output signal, as follows:

$Rh11=(R1(-3)+3R11)/4$, $Gh12=G12$, $Bh13=B13$,
$Gh14=G14$, $Rh15=(R11+3R15)/4$, $Gh16=G16$,
$Bh17=B17$ and $Gh18=G18$, ...

wherein in the (4k+1)th row and the (4k+2)th row, wherein k represents an integer 0 or more, arranged adjacently in the vertical direction, R11, G12, B13, G14, R15, G16, B17, G18 . . . represent signals indicating the mixed pixels to be input as input signals if the two pixels of the same color arrayed in the horizontal direction are read out in mixture from the CCD 22, and further, Rh11, Gh12, Bh13, Gh14, Rh15, Gh16, Bh17, Gh18 . . . represent output signals in that case. Incidentally, there is no R1(-3) with respect to Rh11, Rh11 is 3R11/4 in actual. Otherwise, Rh11 may be R11.

Moreover, the correcting circuit 42 outputs an output signal, as follows:

$Bh21=(B2(-3)+3B21)/4$, $Gh22=G22$, $Rh23=B23$,
$Gh24=G24$, $Bh25=(B21+3B25)/4$, $Gh26=G26$,
$Rh27=B27$ and $Gh28=G28$ . . .

wherein in the (4k+3)th row and the (4k+4)th row, wherein k represents an integer 0 or more, arranged adjacently in the vertical direction, B21, G22, R23, G24, B25, G26, R27, G28 . . . represent signals indicating the mixed pixels to be input as input signals if the two pixels of the same color arrayed in the horizontal direction are read out in mixture from the CCD 22, and further, Bh21, Gh22, Rh23, Gh24, Bh25, Gh26, Rh27, Gh28 . . . represent output signals in that case. Incidentally, there is no B2(-3) with respect to Bh21, Bh21 is 3B21/4 in actual. Otherwise, Bh21 may be B21.

That is to say, the correcting circuit 42 calculates the pixel values of mixed pixels to be shifted by taking a weighted average of the mixed pixel which is positioned four mixed pixels leftward of the target mixed pixels, and the target mixed pixel at a weighing ratio of 1:3, wherein a first mixed pixel is referred to as a first pixel to be corrected, and thereafter, every four mixed pixel is to be corrected, in the case where the pixels in the two rows adjacent to each other in the vertical direction are regarded as pixels in one row and when the two pixels of the same color in the horizontal direction in each of the rows are read out in mixture from the CCD 22 of the honeycomb array. Here, the first mixed pixel may not be corrected. As a consequence, it is possible to uniformly locate the center positions of the mixed pixels per row.

In this manner, in the first embodiment, the center positions of the mixed pixels can be uniformly located per at least row by the correcting circuit 42 in the case where the digital camera using the CCD 22 of the honeycomb array picks up the moving image at the resolution lower than the highest resolution by reading out the two pixels of the same color arrayed in the horizontal direction in mixture from the CCD 22 in order to enhance the throughput of the moving image. The above-described correction of the center position can suppress the generation of a false signal or a false color in the case where the image is produced based on the mixed pixels.

The description has been given above of the embodiment in which, as illustrated in FIGS. 4 and 5, the center positions of the mixed pixels of the colors B and G are fixed in the (4k+1)th and (4k+2)th rows; the center positions of the mixed pixels of the colors R and G are fixed in the (4k+3)th and (4k+4)th rows; the center positions of the mixed pixels of the color R are shifted in the (4k+1)th row; and further, the center positions of the mixed pixels of the color B are shifted in the (4k+3)th row, so that the center positions of the mixed pixels can be corrected to be uniformly located in the horizontal direction in each of the rows. However, the invention is not limited to the above-described embodiment.

For example, the center positions of the mixed pixels of the color R may be fixed in the (4k+1)th row, and further, the center positions of the mixed pixels of the color B may be fixed in the (4k+3)th row; in contrast, the center positions of the mixed pixels of the color B may be shifted in the (4k+1)th row, and further, the center positions of the mixed pixels of the color R may be shifted in the (4k+3)th row. Consequently, the center of the mixed pixels can be uniformly located in the horizontal direction. Alternatively, the center positions of the mixed pixels of the colors R and B may be shifted, so that the center of the mixed pixels can be uniformly located in the horizontal direction.

When the mixed pixels including the pixels in the columns in the vertical direction are viewed, the center positions of the mixed pixels of each of the colors after the correction illustrated in FIGS. 4 and 5 are arranged in the same honeycomb array as that of the pixels of the CCD 22. Therefore, it is possible to more suppress the generation of a false signal or a false color, and further, to make handling thereafter easy without any need of a special correction in the subsequent process, for example, in the process for displaying on the LCD 72. It takes more time for the correcting processing if the number of pixels to be corrected is increased. Therefore, the correction as illustrated in FIGS. 4 and 5 is desirable in order to shorten the time required for the correcting processing.

Moreover, although the description has been given above of the embodiment in which the correcting circuit 42 is provided for correcting an analog signal before the signal processing, which is output from the CCD 22 so as to correct the center position of the mixed pixel, the invention is not limited to the above-described embodiment. For example, as indicated by a dotted line in FIG. 1, the correcting circuit 42 may be included in the image pickup control unit 62, in which the signal processing is performed, and then, the digital image data, which is A/D-converted by the A/D converter 46, may be subjected to the above-described correction.

Figure 6:
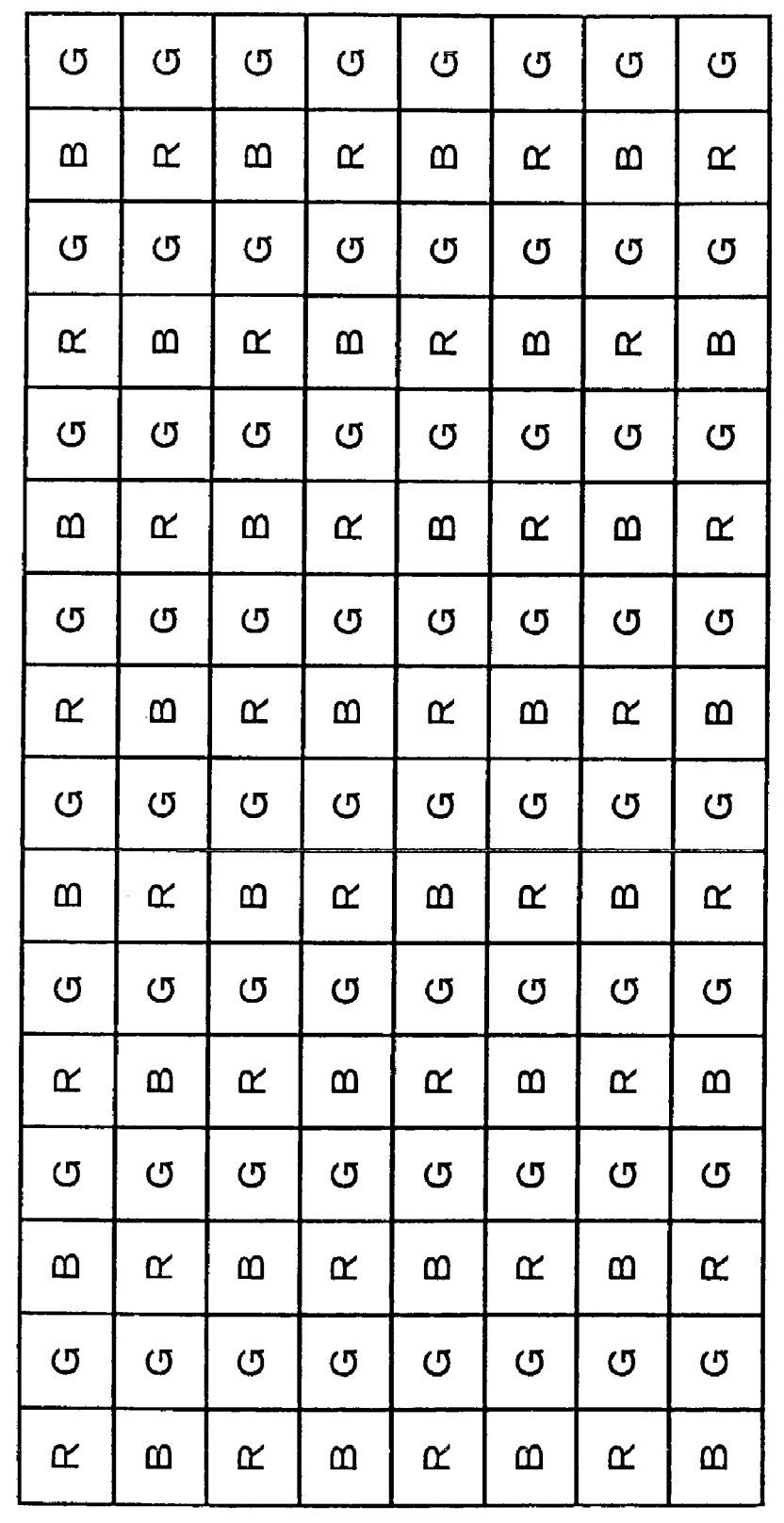

Incidentally, although the description has been given above of the CCD in which the pixels of each of the colors are arrayed in a honeycomb fashion, the array of the pixels in the CCD in the invention is not limited to the above-described embodiment. The invention is essentially featured in that the center positions of the mixed pixels are corrected in such a manner as to be uniformly located when the pixels of the same color are mixed together. For example, as illustrated in FIG. 6, in the case where two pixels of the same color arrayed in the horizontal direction are mixed in a digital camera using a CCD, in which pixels of colors are arrayed such as a CCD of a so-called array composed of a G stripe and an R/B complete zigzag, the center positions of the mixed pixels can be corrected by the processing by the correcting circuit 42 in the same manner as described above.

Otherwise, the invention can be applied to a digital camera using a CCD of an RGB stripe array or a Bayer array, for example.

Second Embodiment

Subsequently, a second embodiment will be described in which the invention is applied to a digital camera using a CCD of an RGB stripe array. Here, the second embodiment is configured in the same manner as the first embodiment except for the pixel array in the CCD 22. Therefore, a detailed description will be given below of only the pixel array in the CCD 22. Moreover, the same members as those in the first embodiment will be designated by the same reference numerals in the first embodiment.

As illustrated in FIG. 7, in the array of pixels of colors R, G and B in the CCD 22 in the second embodiment, that is, in a so-called RGB stripe array, the respective pixels of the colors R, G and B are arrayed in order one by one such that a pixel R, a pixel G, a pixel B, a pixel R, a pixel G, a pixel B onwards are arrayed in the horizontal direction; in contrast, the pixels of the same color are arrayed in the vertical direction. As a consequence, the respective pixels of the colors R, G and B are arrayed in a stripe manner.

Figure 8:
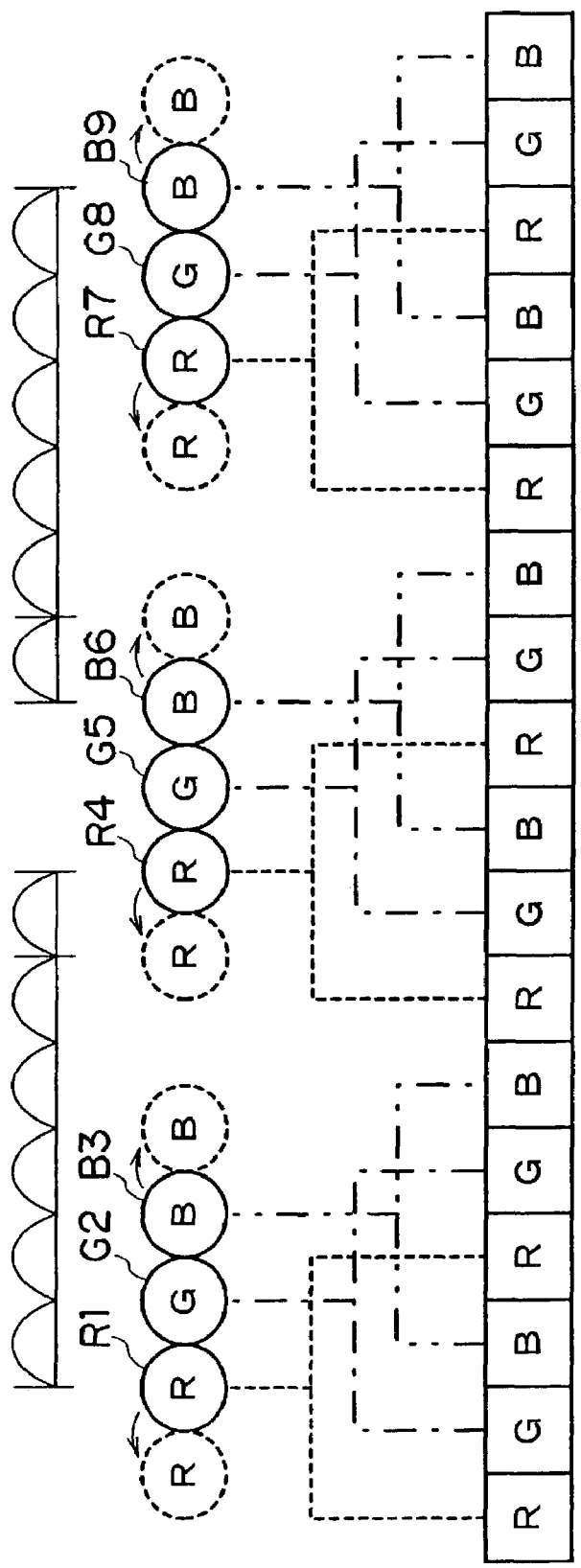
FIG. 8 is a diagram conceptually illustrating a method for correcting the center position of a mixed pixel in the case where two pixels of the same color are read out in mixture in the CCD of the RGB stripe array in the second embodiment.

When a moving image is picked up, since two pixels of the same color arrayed in the horizontal direction are read out in mixture from the CCD 22, the centers of the pixels read out in mixture (hereinafter referred to as "mixed pixels") in the CCD 22 of the RGB stripe array, as illustrated in FIG. 7, are located at the center positions of the two mixed pixels, as illustrated in FIG. 8. Incidentally, the center position of the mixed pixel obtained by mixing the two pixels of the same color arrayed in the horizontal direction is indicated by a circle drawn by a solid line in FIG. 8. Hereinafter, in order to distinguish the mixed pixels from each other, each of the mixed pixels will be explained by adding a one-digit numeral Y to an alphabet (R, G or B) representing the color of the mixed pixel, wherein Y represents the order of the mixed pixel from the left in FIG. 8, as encircled by a solid line illustrated in FIG. 8.

As is clear from FIG. 8, the center positions of mixed pixels R1, G2 and B3 are uniformly arranged, and thereafter, the center positions of mixed pixels R4, G5 and B6 are uniformly arranged apart by three pixels (i.e., mixed pixels), and further, the center positions of mixed pixels R7, G8 and B9 are uniformly arranged apart by three pixels.

In order to uniformly arrange the center positions of the mixed pixels in the horizontal direction in one row in the horizontal direction, the center positions of the mixed pixels of a color R (i.e., mixed pixels R1, R4 and R7) and the center positions of the mixed pixels of a color B (i.e., mixed pixels B3, B6 and B9) are shifted to positions indicated by circles drawn by dotted lines in FIG. 8, respectively (see arrows in FIG. 8). In other words, the center position of the mixed pixel of the color R is required to be shifted forward by one pixel (i.e., leftward in FIG. 8); in contrast, the center position of the mixed pixel of the color B is required to be shifted rearward by one pixel (i.e., rightward in FIG. 8).

For example, the center position of the mixed pixel R4 is simply shifted to a position obtained by dividing the distance between the centers of the mixed pixels R1 and R4 at 5:1. The center of the mixed pixel R4 can be shifted by weighing the pixel values of the mixed pixels R1 and R4 at a weighing ratio of 1:5, and then, taking a weighted average (i.e., (R1+5R4)/6). Moreover, for example, the center position of the mixed pixel B6 is simply shifted to a position obtained by dividing the distance between the center positions of the mixed pixels B6 and B9 at 1:5. The center position of the mixed pixel B6 can be shifted by weighing the pixel values of the mixed pixels B6 and B9 at a weighing ratio of 5:1, and then, taking a weighted average (i.e., (5B6+B9)/6).

To sum up the above description, the correcting circuit 42 simply performs the same correcting processing in each row since the pixel arrays in the rows are the same as each other in the RGB stripe array. The correcting circuit 42 outputs an output signal, as follows:

$Rh1=(R(-2)+5R1)/6$, $Gh2=G2$, $Bh3=(5B3+B6)/6$,
$Rh4=(R4+5R1)/6$, $Gh5=G5$, $Bh6=(5B6+B9)/6$,
$Rh7=(R4+5R7)/6$ and $Gh8=G8$, $Bh9=(5B9+B12)/6$, . . .

wherein R1, G2, B3, R4, G5, B6, R7, G8, B9 . . . represent input signals if a signal indicating each of the mixed pixels obtained by reading out in mixture the two pixels of the same color arrayed in the horizontal direction from the CCD 22 is input, and further, Rh1, Gh2, Bh3, Rh4, Gh5, Bh6, Rh7, Gh8, Bh9 . . . represent output signals in that case. Incidentally, there is no R(−2) with respect to Rh1, Rh1 is 5R1/6 in actual. Otherwise, Rh1 may be R1.

That is to say, in the case where the two pixels of the same color in the horizontal direction are read out in mixture from the CCD 22 of the RGB stripe array, (3n+1)th and (3n+3)th mixed pixels, wherein n represents an integer 0 or more, are to be corrected in each of the rows. Furthermore, the pixel value of the target (3n+1)th mixed pixel is obtained by taking a weighted average of (3n−2)th mixed pixel (i.e. three mixed pixels leftward) and the target (3n+1)th mixed pixel at a weighing ratio of 1:5; and further, pixel value of (3n+3)th mixed pixel is obtained by taking a weighted average of (3n+6)th mixed pixel and the target (3n+3)th mixed pixel at a weighing ratio of 5:1. Here, the first mixed pixel may not be corrected. As a consequence, it is possible to uniformly locate the centers of the mixed pixels per row. Additionally, as is clear from FIG. 8, the center positions of the mixed pixels of the colors after the correction are arrayed in the RGB stripe array which is the same as the pixel array of the CCD 22. Thus, the handling thereafter becomes easy.

In this manner, in the second embodiment, the center positions of the mixed pixels can be uniformly located per at least row by the correcting circuit 42 in the case where the digital camera using the CCD 22 of the RGB stripe array picks up the moving image at a resolution lower than a highest resolution by reading out the two pixels of the same color arrayed in the horizontal direction in mixture from the CCD 22 in order to enhance the throughput of the moving image. The above-described correction of the center position can suppress the generation of a false signal or a false color in the case where an image is produced based on the mixed pixels.

The description has been given above of the embodiment in which, as illustrated in FIG. 8, the center positions of the mixed pixels of the color G are fixed while the center positions of the mixed pixels of the colors R and G are shifted, so that the center positions of the mixed pixels can be uniformly located in one row in the horizontal direction. However, the center positions of the mixed pixels of the color R may be fixed while the center positions of the mixed pixels of the colors G and B may be shifted. Otherwise, the center positions of the mixed pixels of the color B may be fixed while the center positions of the mixed pixels of the colors R and G may be shifted.

Third Embodiment

Subsequently, a third embodiment will be described in which the invention is applied to a digital camera using a CCD of a Bayer array. Here, the third embodiment is configured in the same manner as the first embodiment except for the pixel array in the CCD 22. Therefore, a detailed description will be given below of only the pixel array in the CCD 22. Moreover, the same members as those in the first embodiment will be designated by the same reference numerals in the first embodiment.

In the array of pixels of colors R, G and B in the CCD 22 in the third embodiment, that is, in a so-called Bayer array, each of pixels receives light of any of the colors R, G and B. A first row is composed of R and G disposed in alternation, a second row is composed of G and B disposed in alternation, and third and following rows are alternating repetitions of the first row and second row in a first direction and a second direction perpendicular to the first direction.

That is to say, as illustrated in FIG. 9, one group is composed of 2×2 pixels, i.e., two pixels G, one pixel R and one pixel B, wherein the pixels G are diagonally arrayed. The plurality of groups are arranged in horizontal and vertical directions in such a manner that the pixels G are arrayed in a zigzag manner.

Figure 10:
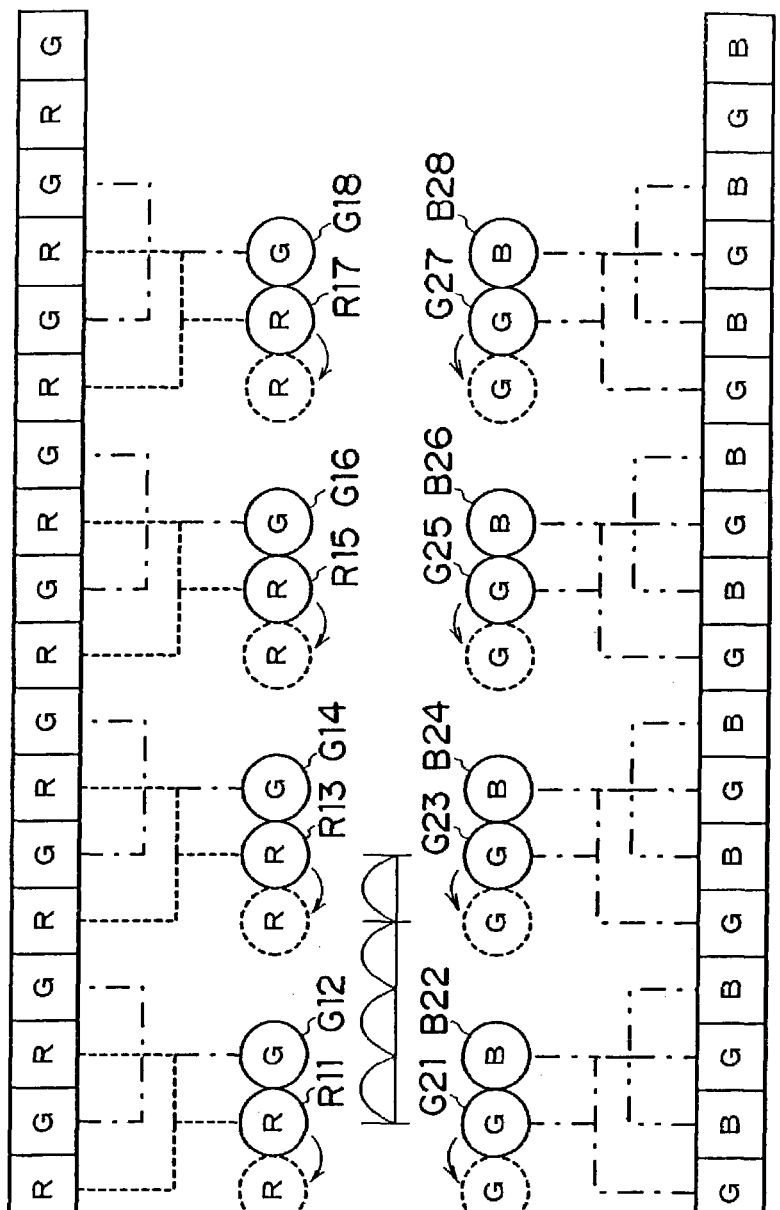
FIGS. 10A and 10B are diagrams conceptually illustrating a method for correcting the center position of a mixed pixel in the case where two pixels of the same color are read out in mixture in the CCD of the Bayer array in the third embodiment.

When the moving image is picked up, since two pixels of the same color arrayed in the horizontal direction are read out in mixture from the CCD 22, the center of the pixel read out in mixture (hereinafter referred to as "a mixed pixel") in the CCD 22 of the Bayer array, as illustrated in FIG. 9, is located at the center position of the two mixed pixels, as illustrated in FIGS. 10A and 10B. Incidentally, the center position of the mixed pixel obtained by mixing the two pixels of the same color arrayed in the horizontal direction in each of a (2k+1)th row and a (2k+2)th row, wherein k represents an integer 0 or more, is indicated by a circle drawn by a solid line in FIGS. 10A and 10B. Hereinafter, in order to distinguish the mixed pixels from each other, each of the mixed pixels will be explained by adding a two-digit numeral XY to an alphabet (R, G or B) representing the color of the mixed pixel, wherein X is 1 in the (2k+1)th row and is 2 in the (2k+2)th row, and further, Y represents the order of the mixed pixel from the left in FIGS. 10A and 10B, as indicated by the circles drawn by the solid lines in FIGS. 10A and 10B.

As is clear from FIGS. 10A and 10B, the center positions of mixed pixels R11 and G12 are uniformly arranged in the (2k+1)th row, and thereafter, the center positions of sequential mixed pixels R13 and G14 are uniformly arranged apart by two pixels (i.e., mixed pixels), and further, the center positions of sequential R15 and G16 are uniformly arranged apart by two pixels. In this manner, the center positions of mixed pixels are arranged in repetition. Furthermore, the center positions of mixed pixels G21 and B22 are uniformly arranged in the (2k+2)th row, and thereafter, the center positions of sequential mixed pixels G23 and B24 are uniformly arranged apart by two pixels (i.e., mixed pixels), and further, the center positions of sequential mixed pixels G25 and B26 are uniformly arranged apart by two pixels. In this manner, the center positions of mixed pixels are arranged in repetition.

In order to uniformly arrange the center positions of the mixed pixels in one row in the horizontal direction, the center positions of the mixed pixels of the color R in the (2k+1)th row (the mixed pixels R11, R13, R15 and R17) and the center positions of the mixed pixels of the color G in the (2k+2)th row (the mixed pixels G21, G23, G25 and G27) are shifted to positions indicated by circles drawn by dotted lines in FIGS. 10A and 10B, respectively (see arrows in FIGS. 10A and 10B). In other words, the center position is required to be shifted forward by one pixel (i.e., leftward in FIGS. 10A and 10B).

For example, the center position of the mixed pixel R13 is simply shifted to a position obtained by dividing the distance between the center positions of the mixed pixels R11 and R13 at 3:1. The center position of the mixed pixel R13 can be shifted by weighing the pixel values of the mixed pixels R11 and R13 at a weighing ratio of 1:3, and then, taking a weighted average (i.e., (R11+3R13)/4). Moreover, for example, the center of the mixed pixel G23 is simply shifted to a position obtained by dividing the distance between the centers of the mixed pixels G21 and G23 at 3:1. The center position of the mixed pixel G23 can be shifted by weighing the pixel values of the mixed pixels G21 and G23 at a weighing ratio of 1:3, and then, taking a weighted average (i.e., (G21+3G23)/4).

To sum up the above description, the correcting circuit 42 outputs an output signal, as follows:

$Rh11=(R1(-1)+3R11)/4, Gh12=G12, Bh13=(R11+3R13)/4, Gh14=G14, Rh15=(R13+3R15)/4, Gh16=G16, Rh17=(R15+3R17)/4$ and $Gh18=G18, \ldots$ wherein R11, G12, R13, G14, R15, G16, R17, G18 . . . represent input signals if a signal indicating each of the mixed pixels obtained by reading out in mixture the two pixels of the same color arrayed in the horizontal direction from the CCD 22 is input to the correcting circuit 42 with respect to the pixels in the (2k+1)th row, and further, Rh11, Gh12, Rh13, Gh14, Rh15, Gh16, Rh17, Gh18 . . . represent output signals in that case. Incidentally, there is no R1(−1) with respect to Rh11, Rh11 is 3R11/4 in actual. Otherwise, Rh11 may be R11.

Moreover, the correcting circuit 42 outputs an output signal, as follows:

$Gh21=(G2(-1)+3G21)/4, Bh22=B22, Gh23=(G21+3G23)/4, Bh24=B24, Gh25=(G23+3G25)/4, Bh26=B26, Gh27=(G25+3G27)/4$ and $Bh28=B28, \ldots$ wherein G21, B22, G23, B24, G25, B22, G27, B28 represent input signals if a signal indicating each of the mixed pixels obtained by reading out in mixture the two pixels of the same color arrayed in the horizontal direction from the CCD 22 is input with respect to the pixels in the (2k+2)th row, and further, Gh21, Bh22, Gh23, Bh24, Gh25, Bh26, Gh27, Bh28 . . . represent output signals in that case. Incidentally, there is no G2(−1) with respect to Gh21, Gh21 is 3G21/4 in actual. Otherwise, Gh21 may be G21.

That is to say, in the case where the two pixels of the same color arrayed in the horizontal direction are read out in mixture from the CCD 22 of the Bayer array, the (2n+1)th mixed pixels in row, wherein n represents an integer 0 or more, are target mixed pixels to be corrected in each of the rows. Furthermore, pixel value of the target (2n+1)th mixed pixel is obtained by taking a weighted average of the (2n−1)th mixed pixel (i.e., the mixed pixel of the same color) and the target (2n+1)th mixed pixel at a weighing ratio of 1:3. Here, the first mixed pixel may not be corrected. As a consequence, it is possible to uniformly locate the center positions of the mixed pixels per row. Additionally, as is clear from FIGS. 10A and 10B, the center positions of the mixed pixels of the colors after the correction are located in the Bayer array which is the same as the pixel array of the CCD 22. Thus, the handling thereafter becomes easy.

In this manner, in the third embodiment, the center positions of the mixed pixels can be uniformly located per at least row by the correcting circuit 42 in the case where the digital camera using the CCD 22 of the Bayer array picks up the moving image at a resolution lower than a highest resolution by reading out in mixture the two pixels of the same color arrayed in the horizontal direction from the CCD 22 in order to enhance the throughput of the moving image. The above-described correction of the center position can suppress the generation of a false signal or a false color in the case where an image is produced based on the mixed pixels.

The description has been given above of the embodiment in which, as illustrated in FIGS. 10A and 10B, the center positions of the mixed pixels of the color G are fixed while the center positions of the mixed pixels of the color R are shifted in the (2k+1)th row, and further, the center positions of the mixed pixels of the color B are fixed while the center positions of the mixed pixels of the color G are shifted in the (2k+2)th row, so that the center positions of the mixed pixels can be uniformly located in one row in the horizontal direction. However, the invention is not limited to the above-described embodiment. The center positions of the mixed pixels of the color R may be fixed while the center positions of the mixed pixels of the color G may be shifted in the (2k+1)th row, and further, the center positions of the mixed pixels of the color G may be fixed while the center positions of the mixed pixels of the color B may be shifted in the (2k+2)th row. Here, in order to achieve the Bayer array of the center positions of the mixed pixels of the colors after the correction, it is preferable to fix the center positions of the mixed pixels of the color R in the (2k+1)th row, and further, fix the center positions of the mixed pixels of the color G in the (2k+2)th row, as described above; otherwise, it is preferable to fix the center positions of the mixed pixels of the color G in the (2k+1)th row, and further, fix the center positions of the mixed pixels of the color B in the (2k+2)th row.

Although the descriptions have been given of the first to third embodiments in which the two pixels of the same color are mixed together, the invention is not limited to these embodiments. The invention can be applied to the case where three or more pixels of the same color are mixed together.

Fourth Embodiment

Subsequently, a description will be given of a fourth embodiment in which three or more pixels of the same color are mixed together and to which the invention is applied. Explanation will be made on the case where three or more pixels of the same color arrayed in the horizontal direction are mixed together when a CCD of a honeycomb array is used. Here, since the fourth embodiment is configured in the same manner as the first embodiment, a detailed description will be omitted.

Figure 11:
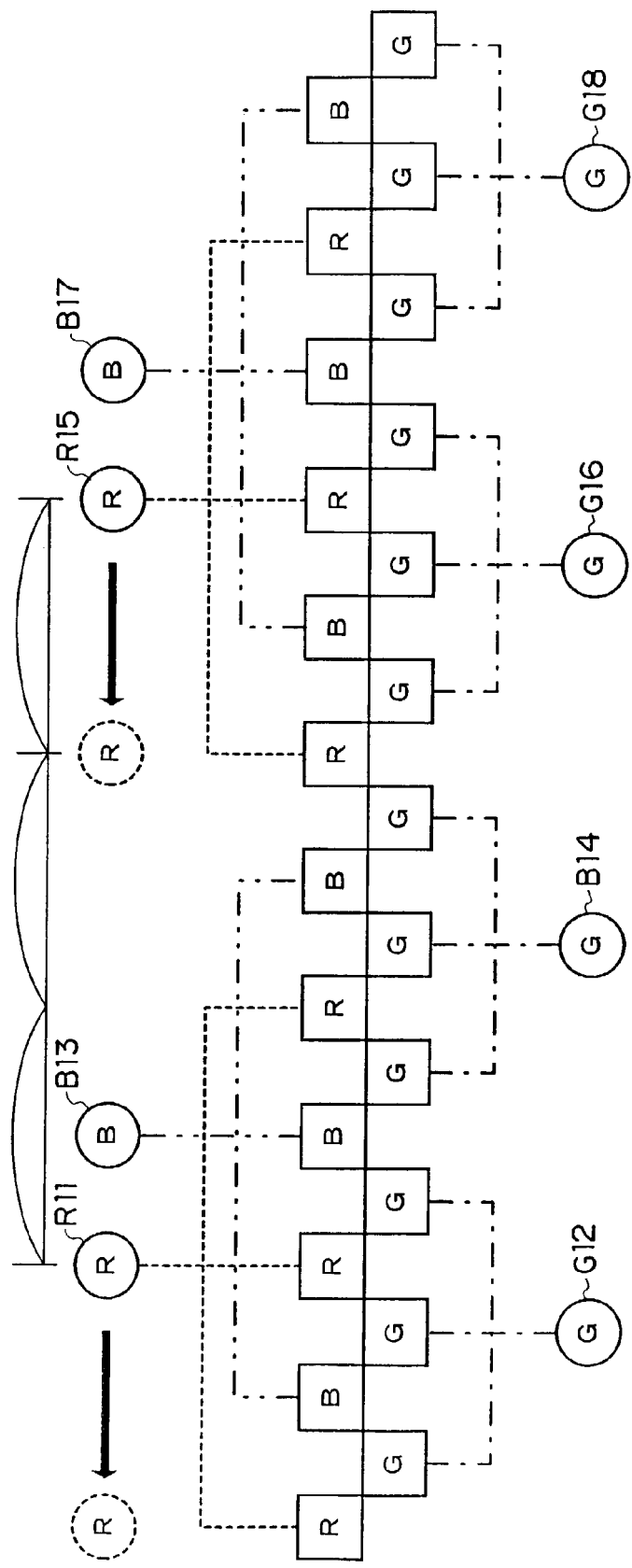
FIG. 11 is a diagram conceptually illustrating a method for correcting the center position of a mixed pixel in the case where three pixels of the same color are read out in mixture in a CCD of a honeycomb array in a fourth embodiment.

Circles drawn by solid lines in FIG. 11 indicate the center positions of mixed pixels in the case where three or more pixels of the same color arrayed in a horizontal direction are mixed together with respect to pixels in a (4k+1)th row and a (4k+2)th row, wherein k represents an integer 0 or more, adjacent to each other in a vertical direction in a CCD 22.

As is clear from FIG. 11, in the case where three pixels are mixed together in the (4k+1)th row and the (4k+2)th row, wherein k represents an integer 0 or more, the center positions of the mixed pixels of colors R, G and B are uniformly located in the horizontal direction by shifting the center positions of the mixed pixels (R11 and R15) of a color R rightward by four pixels (see arrows in FIG. 11), and further, the center positions of the mixed pixels of the colors can be arranged in a honeycomb array.

For example, the center position of the mixed pixel R15 is simply shifted to a position obtained by dividing the distance between the center positions of the mixed pixels R11 and R15 at 2:1. The center position of the mixed pixel R15 can be shifted by simply weighing the pixel values of the mixed pixels R11 and R15 at a weighing ratio of 1:2, and then, taking a weighted average (i.e., (R11 and 2R15)/3).

To sum up the above description, the correcting circuit 42 outputs an output signal, as follows:

$Rh11=(R1(-3)+2R11)/3, Gh12=G12, Bh13=B13,$
$Gh14=G14, Rh15=(R11+2R15)/3, Gh16=G16,$
$Bh17=B17$ and $Gh18=G18, \ldots$ wherein with respect to the pixels in the (4k+1)th row and (4k+2)th row, wherein k represents an integer 0 or more, adjacent to each other in the vertical direction, R11, G12, B13, G14, R15, G16, B17, G18 . . . represent signals indicating mixed pixels to be input as input signals if the two pixels of the same color arrayed in the horizontal direction are read out in mixture from the CCD 22, and further, Rh11, Gh12, Bh13, Gh14, Rh15, Gh16, Bh17, Gh18 . . . represent output signals in that case. Incidentally, there is no R1(-3) with respect to Rh11, Rh11 is 2R11/3 in actual. Otherwise, Rh11 may be R11.

Moreover, although an illustration will be omitted, the correcting circuit 42 outputs an output signal, as follows:

$Bh21=(B2(-3)+2B21)/3, Gh22=G22, Rh23=R23,$
$Gh24=G24, Bh25=(B21+2B25)/3, Gh26=G26,$
$Rh27=R27$ and $Gh28=G28 \ldots$ wherein with respect to the pixels in a (4k+3)th row and a (4k+4)th row, wherein k represents an integer 0 or more, adjacent to each other in the vertical direction, B21, G22, R23, G24, B25, G26, R27, G28 . . . represent signals indicating mixed pixels to be input as input signals if two pixels of the same color arrayed in the horizontal direction are read out in mixture from the CCD 22, and further, Bh21, Gh22, Rh23, Gh24, Bh25, Gh26, Rh27, Gh28 . . . represent output signals in that case. Incidentally, there is no B2(-3) with respect to Bh21, Bh21 is 2B21/3 in actual. Otherwise, Bh21 may be B21.

In this manner, in the fourth embodiment, the center positions of the mixed pixels can be uniformly located per at least row by the correcting circuit 42 in the case where the digital camera using the CCD 22 of the honeycomb array picks up the moving image at a resolution lower than a highest resolution by reading out the three pixels of the same color arrayed in the horizontal direction in mixture from the CCD 22 in order to enhance the throughput of the moving image. The above-described correction of the center position can suppress the generation of a false signal or a false color in the case where an image is produced based on the mixed pixels.

As described in the above first to fourth embodiments, in order to uniformly locate the center positions of the mixed pixels of the colors when the plurality of pixels of the same color are mixed together in the same row irrespective of the pixel array of the CCD, the weighted average is obtained by weighing according to the distance between each of the two mixed pixels and the correction target position by using the two mixed pixels, i.e., the mixed pixel to be corrected, the center position of which is required to be shifted for the uniform arrangement and the mixed pixel of the same color before or after the target mixed pixel, so that the center position of the mixed pixel can be shifted to the correction target position, whereby the centers of the mixed pixels of the colors can be corrected in the uniform arrangement.

The description have been given of the above-described first to fourth embodiments on the assumption that the mixed pixel value is corrected based on two mixed pixels. However, the invention is not limited to the above-described embodiments. For example, pixel value can be corrected based on three or more mixed pixels, in the same way as first to fourth embodiments.

Here, the descriptions have been given of the above-described first to fourth embodiments on the assumption that the plurality of pixels of the same color are read out in mixture from the CCD 22, and then, the correcting circuit 42 corrects the center position of the mixed pixel in order to increase the frame rate when the moving image is picked up. However, the invention is not limited to the above-described embodiments. For example, the invention can be applied also to the case where the still image is picked up when high-speed processing is required.

Furthermore, the descriptions have been given of the above-described first to fourth embodiments in which the CCD 22 mixes the pixels. However, the invention is not limited to the above-described embodiments. The invention can be applied also to the case where the pixels are mixed together after the output signal from the CCD 22 is A/D converted, that is, the digital image data is produced. For example, the invention can be applied also to the case where image data of a relatively low resolution such as an index image is produced by the pixel mixture based on the image data of the high resolution which has been already acquired by the image pickup.

Moreover, the descriptions have been given of the above-described first to fourth embodiments in which the pixels arrayed in the horizontal direction are mixed together. However, the invention can be applied also to the case where pixels arrayed in the vertical direction are mixed together or pixels are mixed together in the horizontal and vertical directions.

Additionally, the pixel array of the colors R, G and B has been described in the above-described first to fourth embodiments. However, the invention can be applied also to the case where a complementary color filter of a similar array is used.

In addition, the descriptions have been given of the above-described first to fourth embodiments in which the CCD is used as the image pickup element. However, the invention is not limited to the above-described embodiments. For example, a CMOS image sensor may be used as the image pickup element.

As described above, the invention can produce the excellent effect of preventing a false signal or a false color from being generated in the case where the image is formed by reading out in mixture the pixels of the same color from the image pickup element.

What is claimed is:

1. A digital camera for picking up an image of a subject by using an image pickup element provided with groups of pixels in a predetermined pixel array, so as to acquire image data representing the image of the picked-up subject, wherein when the image data representing the subject and having a resolution lower than a highest resolution is generated by mixing pixels of the same color, center positions of the pixels of respective colors, which center positions are shifted by the mixing, are uniformly arranged at least within respective rows and the value of each pixel that has a center position shifted is replaced with a value that is a weighted average of pixels that have been mixed by mixing pixels of the same color.

2. A digital camera comprising:

an image pickup unit which is provided with groups of pixels in a predetermined pixel array, for receiving light corresponding to a subject via each of the pixels so as to pick up the subject, and which is able to pick up the subject at a resolution lower than a highest resolution by mixing the pixels of the same color; and a correcting unit for correcting a result of picking-up by the image pickup unit such that center positions of the pixels of respective colors, which center positions are shifted by the mixing, are uniformly arranged at least within respective rows in the case where the subject is picked up by the image pickup unit at a resolution lower than the highest resolution and the value of each pixel that has a center position shifted is replaced with a value that is a weighted average of pixels that have been mixed by mixing pixels of the same color.

3. The digital camera according to claim 1, wherein the center positions of the pixels of the respective colors are corrected such that an array of the corrected center positions of the pixels of the respective colors accords with the predetermined pixel array.

4. The digital camera according to claim 1, wherein the respective rows of the pixel array are positioned in diagonal directions with respect to a horizontal direction;

each of the pixels in the pixel array receives light of one of first, second, and third colors; and in the pixel array, a first diagonal row in both a first diagonal direction at an angle of 45° to the horizontal direction and a second diagonal direction, perpendicular to the first diagonal direction, is composed of pixels for the first color and pixels for the second color disposed in alternation in the first diagonal direction and the second diagonal direction, a second diagonal row in both the first diagonal direction and the second diagonal direction, is composed of pixels for the second color and pixels for the third color disposed in alternation in the first diagonal direction and the second diagonal direction, and subsequent diagonal rows in the first diagonal direction and the second diagonal direction, are alternating repetitions of the first diagonal row and the second diagonal row.

5. A digital camera according to claim 1, wherein each of the pixels in the pixel array receives light of one of first, second, and third colors; and in the pixel array, each row is composed of pixels for the same color in a first direction, and pixels for the first, second, and third colors are disposed in alternation in a second direction perpendicular to the first direction.

6. The digital camera according to claim 2, further comprising:

a setting unit for setting an image pickup resolution of the image pickup element, wherein the image pickup element does not mix pixels in a case where the resolution set by the setting unit is the highest resolution, and the image pickup element mixes the pixels according to the set resolution in a case where the resolution set by the setting unit is lower than the highest resolution.

7. An image pickup device comprising:

an image pickup unit for picking up an image of a subject via a plurality of pixels in a predetermined pixel array, and obtaining pixel values of mixed pixels by mixing a plurality of pixel values for each group of a plurality of pixel groups, each of which is composed of a plurality of pixels acquired by the image pickup; and a correcting unit for calculating a pixel value of a corrected pixel positioned among the plurality of mixed pixels obtained by the image pickup unit, based on positional information of the corrected pixel with respect to positions of the plurality of mixed pixels and the pixel values of the plurality of mixed pixels, wherein the correcting unit weighs the pixel value of each of the plurality of mixed pixels based on the positional information of the corrected pixel with respect to the plurality of mixed pixels, so as to calculate the pixel value of the corrected pixel, and the positional information represents a ratio of distances from the corrected pixel to each of the plurality of mixed pixels.

8. The image pickup device according to claim 7, wherein a pixel value z of the corrected pixel located at a position dividing a distance between a first mixed pixel having a pixel value of x and a second mixed pixel having a pixel value of y at a ratio of a:b is expressed by the following equation:

$$z=(bx+ay)/(a+b).$$

9. An image pickup device comprising:

an image pickup unit for picking up an image of a subject via a plurality of pixels in a predetermined pixel array, and obtaining pixel values of mixed pixels by mixing a plurality of pixel values for each group of a plurality of pixel groups, each of which is composed of a plurality of pixels acquired by the image pickup; and a correcting unit for calculating a pixel value of a corrected pixel positioned among the plurality of mixed pixels obtained by the image pickup unit, based on positional information of the corrected pixel with respect to positions of the plurality of mixed pixels and the pixel values of the plurality of mixed pixels, wherein the image pickup unit outputs the pixel values of the mixed pixels as signals, and the correcting unit calculates the pixel value of the corrected pixel by weighing the pixel values of the plurality of mixed pixels based on the positional information of the corrected pixel with respect to the plurality of mixed pixels.

10. The image pickup device according to claim 7, wherein the image pickup unit outputs the pixel values of the mixed pixels as signals, and the correcting unit calculates the pixel value of the corrected pixel based on the pixel values of the mixed pixels, the signals of which have been output from the image pickup unit and have not been subjected to a signal processing.

11. The image pickup device according to claim 9, wherein a pixel value z of the corrected pixel located at a position dividing a distance between a first mixed pixel having a pixel value of x and a second mixed pixel having a pixel value of y at a ratio of a:b is expressed by the following equation:

$$z=(bx+ay)/(a+b).$$

* * * * *